April 14, 1942. W. J. SCHREINER 2,279,642
CLAMP
Filed Dec. 5, 1938
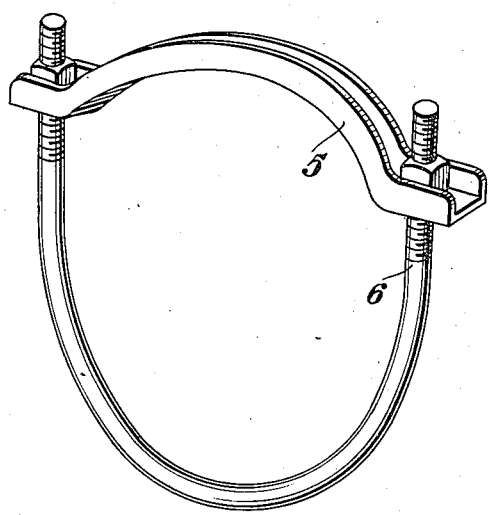
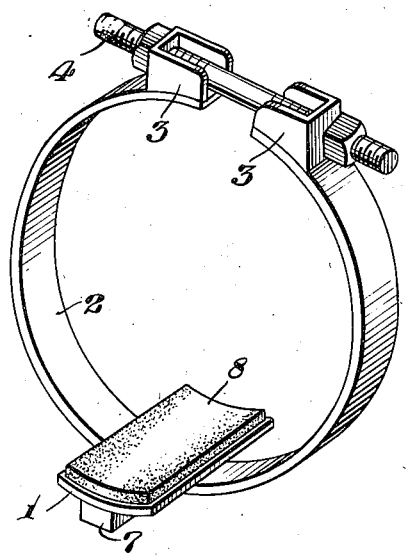
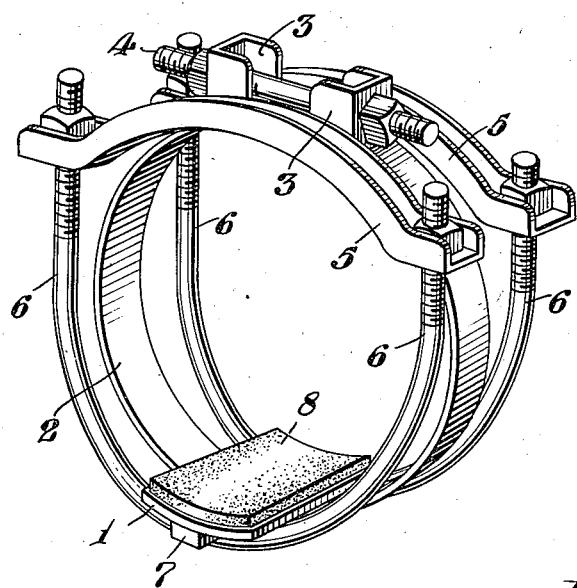
Inventor:
William Joseph Schreiner Patented Apr. 14, 1942

2,279,642

UNITED STATES PATENT OFFICE 2,279,642

CLAMP

William Joseph Schreiner, Cincinnati, Ohio

Application December 5, 1938, Serial No. 243,985

3 Claims. (Cl. 138—99)

This invention relates to a new clamp for repairing pipes.

In the repair of pipes, greatly different conditions are encountered. Existing devices, which may be effective in particular circumstances, are not suitable to all these conditions. Pipes which have large breaks or holes, or extensive corroded areas, or high internal pressures, can not be repaired by that class of devices which comprise a rigid plate held in place over a gasket by a clamp or bolts. The difficulty arises from the problem of getting an effective seal with something that does not conform to the irregular surface. Nor can the trouble be overcome by the use of those devices which include a cone or molded gasket, particularly if the pipe has several or large breaks or holes. Obstacles also arise in the use of devices which completely encase the pipe, with means for sealing at the ends, since the adjacent surfaces are not always suitable for their application. Such devices are also uneconomical, heavy, and cumbersome.

The object of my invention is the easy, safe, and economical repair of pipes under all conditions, including those where existing devices are ineffective, such as large or numerous holes or pits or high internal pressures.

Another, related object is the repair of pipe by a covering plate which will give it a new surface as good as the original, thus restoring its utility and value.

The idea of this invention is to apply to a portion of the pipe, regardless of its size or the extent of its corrosion or breaks or the pressure of the contained fluid, a covering or plate, adapted so uniformly, and held in place so tightly as to constitute a complete restoration of the pipe to its strength and condition.

The invention comprises a semi-rigid plate and adapting apparatus, including means for adjusting its position and means for conforming it to the pipe over a suitable packing. The joint operation of the several features makes possible the application of sufficient uniform pressure to effect a permanent repair, irrespective of the condition of the pipe. This unitary result is new and useful.

The features of the invention are shown in the accompanying drawing, in which:

Figure 1 is an elevation view of the conforming apparatus;

Figure 2 is an elevation view of the plate and the adjusting apparatus; and

Figure 3 is an elevation view of the clamp completely assembled.

Similar numerals refer to similar parts throughout the several views.

The construction of the clamp is best understood in connection with the drawing. The plate 1 is the covering element of the clamp. It is of metal of such quality as to be semi-rigid so that it can be adapted or changed in shape and position to fit the condition of the pipe being repaired. To assist in satisfactory adapting, the plate is shaped like the pipe, preferably on a somewhat larger radius. The plate may be slightly larger than the packing, to allow the latter to expand, and to facilitate welding to the pipe, if this is desired. A narrow molding around the inner margins of the plate may be used as an accessory.

The band 2 is the means for adjusting the position of the plate 1 with respect to the pits in the pipe so that uniform pressure will be exerted on the packing by the conforming devices. The band also assists in holding the clamp in place against the presure of the leaking fluid. Further, it facilitates the quick adjustment of the plate and packing, so that the latter is not destroyed by vibration. To effect these results, the band is made of flexible metal such as steel, preferably cold rolled to a shape similar to the pipe. The band may be tacked to the plate, preferably by welding, to facilitate assembly and adjustment. Small openings in the band near the plate permit easy inspection of the packing at these locations.

The fastener 3 is attached to the band 2. These fasteners are metal lugs or projections which act as a means for tightening the band and as accessories to the band in adjusting the position of the plate 1. The fasteners are joined to the ends of the band, preferably by welding. The stud 4 goes through holes in the fasteners, and tightens the band. The fasteners are designed so there is sufficient clearance between the stud and the pipe to permit prying and adjusting of the band.

The supporting frame 5 is a bearing for the clamp, and a frame to which the tightening fitting 6 may be fastened, as shown in Figure 1. The combination is a part of the conforming apparatus, or means for causing the clamp to take the proper shape. The supporting frame 5 is rigid, strong, arched or shaped like the pipe, and may be of metal such as steel or cast iron. It is so proportioned as to prevent distortion or crushing. The supports are so located as to allow the lower fitting 6 to exert the maximum proper tightening and conforming effect.

The tightening fitting 6 is the means for applying pressure to the plate 1 and conforming it to the pipe. It is tough and strong enough to furnish the necessary pressure, and is so formed on a radius somewhat greater than that of the pipe that this pressure is initially concentrated at a desired point, say the center, and later applied at other points as needed. The tightening fitting should be more rigid than the plate. It is preferably made of metal such as automobile steel.

The rib 7 is a part of the adapting apparatus, and is a means whereby the tightening devices can exert sufficient pressure initially at the desired location. It is a strong, narrow metal strip along the length of the plate, preferably in its center. It is on the outer surface of the plate, and may be tacked thereto, as by welding.

The packing 8 is the seal or means for closing the joint between the adaptable plate 1 and the pipe. The packing is preferably flat and uniform, so that it can be adapted to whatever shapes and surface conditions of pipe are encountered. It may be fastened to the plate with cement for ease in assembling. It may be made solid, in layers, or as a ring. The packing is of a substance that is plastic enough to be shaped to the surface inequalities, yet elastic and strong enough to resist pressure and seal the joint permanently without tearing. The substance may be asbestos, or a rubber or synthetic rubber compound. To absorb vibration and assist in the avoidance of burning due to friction, the packing preferably comprises a synthetic rubber compound of proper hardness and composition. The quality may be specified between forty and seventy-five on a Shore durometer (type A). A formula for the packing compound is given below.

| | |
|---|---|
| Synthetic rubber (chloroprene derivatives such as neoprene or butadiene polymers of the German Buna type) | 100 |
| Reinforcing and/or non-reinforcing fillers | 50-275 |
| Softeners and diluents | 5-150 |
| Antioxidants | 1-5 |
| Vulcanizing agents | 5-40 |

Vulcanization for 60 minutes at 310 degrees F.

When used in repairing a pipe which contains a fluid under pressure, my clamp is applied to the damaged area, then adjusted and conformed to effect a permanent restoration. The operation of the invention is given in the following description.

The plate 1, the rib 7, the packing 8, the band 2, and the fastener 3 are fastened together as described previously, to constitute a covering and adjusting unit. This unit is shown in Figure 2. It is placed in position, with the packing covering the damaged area as evenly as possible by sight. The stud 4 and its nuts are assembled loosely to hold the unit in place.

Adjustment of the unit may now be accomplished by means of a small prying tool, such as a scraper or pick, under the stud. When the proper position is attained to seal the damaged area as perfectly as possible, the band is tightened by the stud and nuts. The plate and packing are now in a position where they may be conformed to the pipe effectively.

The conforming unit comprises the supporting frame 5 and the tightening fitting 6 and its nuts. It is shown in Figure 1. One or more of these units may be placed in position adjacent to the band, as shown in the assembly, Figure 3. The tightening fitting bears first on the rib 7, thus putting the greatest initial pressure in the center of the damaged area, where it is needed. Conforming is continued as the clamp is drawn up, and the tightening fitting 6 bends and exerts increasing pressure on the sides of the plate as well as the rib. Inasmuch as the plate and packing have been previously adjusted, this conformation results in the application of uniform pressure upon the damaged surface of the pipe. The complete operation is such an adapting of the clamp as will seal the area and effect a complete repair.

The new results that are accomplished by this invention may be described as follows.

The damaged pipe is completely restored to its original strength and value, inasmuch as the clamp includes a plate similar to it in shape and substance.

An extensive damaged area may be covered, because the size of the plate is not limited.

The plate, being semi-rigid, is adaptable to effect a permanent repair, regardless of the condition of the pipe surface.

The clamp includes flexible adjusting means, so that assembly against high pressure leaking fluids is made possible.

The adjusting device effects a quick stoppage of the leak. Thus, danger of the packing being destroyed by the heat of friction or vibration is eliminated. Further, an efficient repair is facilitated, since the dangerous and valuable fluid is controlled without delay.

The plate and packing are adjusted uniformly over the inequalities of the pipe surface, so that low gasket pressure areas are eliminated. Effective adapting and sealing are thus made possible.

The substance and arrangement of the conforming apparatus is such that there is no distortion of the pipe, yet pressure is exerted in the proper amounts and places so that adequate sealing is accomplished.

Proper adapting is aided by the rib, which enables the tightening fitting to exert initial pressure at the desired place, and gives it a fulcrum for the application of pressure at the sides as needed.

The danger of crushing the damaged pipe is avoided by the use of a uniform packing, which is adaptable by the plate to whatever shapes and surface conditions are encountered. The packing is so compounded that the possibility of its destruction is eliminated.

The repair of damaged pipes, including those with large or numerous holes or pits or high internal pressures, is made possible by the unique mechanism of my clamp, which is the combination of a plate and suitable packing, and means for adapting it to the pipe.

I claim:

1. A pipe repair clamp comprising a covering plate; a flexible adjusting band for holding said plate against the pipe and adjusting its position; and separate clamping means for conforming and securing said plate to the pipe.

2. A pipe repair clamp comprising a covering plate; a pressure rib on the bottom of said plate; a flexible adjusting band for holding said plate against the pipe and adjusting its position; and separate clamping means for conforming and securing said plate to the pipe.

3. A pipe repair clamp comprising a semi-rigid bottom covering plate of a radius somewhat larger than that of the pipe; a pressure rib on the bottom of said plate; a flexible adjusting band for holding said plate against the pipe and adjusting its position; fasteners attached to the ends of said band for tightening it, and held together by a stud with sufficient clearance above the pipe to permit prying and adjusting; a tightening fitting shaped on a radius somewhat larger than that of the pipe to conform and hold aforesaid plate to the pipe; a rigid top supporting frame, proportioned so as to prevent distortion, to which said tightening fitting is fastened; and a packing of synthetic rubber, of hardness between forty and seventy-five expressed on a Shore durometer (type A), to be pressed to the pipe by the plate as said plate is conformed thereto.

WILLIAM JOSEPH SCHREINER.